United States Patent
Hashizume et al.

(10) Patent No.: US 7,435,441 B2
(45) Date of Patent: Oct. 14, 2008

(54) FAT COMPOSITION

(75) Inventors: Kenichi Hashizume, Tokyo (JP); Yasuo Okutomi, Tokyo (JP); Toru Kajimura, Tokyo (JP); Miki Shirahane, Tokyo (JP)

(73) Assignee: Adeka Corporation, Tokyo (JP)

(*) Notice: Subject to any disclaimer, the term of this patent is extended or adjusted under 35 U.S.C. 154(b) by 946 days.

(21) Appl. No.: 10/475,537

(22) PCT Filed: Jan. 20, 2003

(86) PCT No.: PCT/JP03/00427

§ 371 (c)(1),
(2), (4) Date: Oct. 22, 2003

(87) PCT Pub. No.: WO03/061397

PCT Pub. Date: Jul. 31, 2003

(65) Prior Publication Data

US 2004/0126475 A1    Jul. 1, 2004

(30) Foreign Application Priority Data

Jan. 23, 2002 (JP) ............... 2002-013754
Jan. 25, 2002 (JP) ............... 2002-017579
Jan. 25, 2002 (JP) ............... 2002-017580
Dec. 25, 2002 (JP) ............... 2002-375301

(51) Int. Cl.
    A23D 9/00    (2006.01)
(52) U.S. Cl. .................. 426/606; 426/607; 426/601
(58) Field of Classification Search ............... 426/606, 426/607
    See application file for complete search history.

(56) References Cited

U.S. PATENT DOCUMENTS

| | | | | |
|---|---|---|---|---|
| 2,521,242 A | * | 9/1950 | Mitchell, Jr. ............... | 426/606 |
| 2,815,285 A | * | 12/1957 | Holman et al. ............. | 426/606 |
| 2,815,286 A | * | 12/1957 | Andre et al. ............... | 426/606 |
| 2,975,061 A | | 3/1961 | Soeters et al. | |
| 2,999,022 A | * | 9/1961 | Payne et al. ................ | 426/417 |
| 3,189,465 A | | 6/1965 | Oakley et al. | |
| 3,360,376 A | * | 12/1967 | Dobson ...................... | 426/573 |
| 3,492,130 A | * | 1/1970 | Harwood .................... | 426/607 |
| 3,796,806 A | * | 3/1974 | McCarthy ................... | 426/417 |
| 3,857,985 A | * | 12/1974 | Reid et al. ................. | 426/606 |
| 3,914,452 A | * | 10/1975 | Norris ....................... | 426/549 |
| 4,335,157 A | * | 6/1982 | Varvil ....................... | 426/606 |
| 4,391,838 A | * | 7/1983 | Pate .......................... | 426/606 |
| 5,023,101 A | * | 6/1991 | Sugihara et al. ........... | 426/603 |
| 5,424,091 A | * | 6/1995 | Cain et al. ................. | 426/610 |
| 5,470,598 A | * | 11/1995 | Scavone .................... | 426/607 |
| 5,476,676 A | * | 12/1995 | Cain et al. ................. | 426/607 |
| 6,033,598 A | * | 3/2000 | Kaneko et al. ............. | 252/299.1 |
| 6,103,292 A | * | 8/2000 | Del Vecchio .............. | 426/601 |

FOREIGN PATENT DOCUMENTS

| | | |
|---|---|---|
| EP | 0 388 853 | 3/1989 |
| GB | 1 455 581 | 11/1976 |
| JP | B-51-9763 | 3/1976 |
| JP | B-58-13128 | 3/1983 |
| JP | 59156242 | 9/1984 |
| JP | 4075590 | 3/1992 |
| JP | 4135453 | 5/1992 |
| JP | 9-103244 | 4/1997 |
| JP | A-10-295271 | 11/1998 |
| JP | 2001238597 | 9/2001 |
| JP | 2002-038190 | * 2/2002 |
| JP | 2002-065160 | * 3/2002 |
| JP | 2002-69483 | 3/2002 |
| JP | 2002-069484 | 3/2002 |

OTHER PUBLICATIONS

Wille, R. L. 1966. Polymorphism of Cocoa Butter. JAOCS 43:491.*
Gunstone, F. D. 1983. Lipids in Foods, Chemistry, Biochemistry and Technology. Pergamon Press, Ltd. p. 149 and 154.*
Wan, P. J. 1991. Introduction to Fats and Oil Technology. American Oil Chemists' Society, Champaign, Illinois, p. 108-110, 192-197.*
Database FSTA 'Online! International Food Information Service (IFIS), Frankfurt-Main, DE; 1993, Koyano T: "Studies of the physical properties of solid fats for chocolate through specific molecular interactions.", XP002315441.
Minato Akiyoshi et al. "FT—IR study on microscopic structures and conformations of POP-PPO and POP-OPO molecular compounds", Chemistry and Physics of Lipids, vol. 88, No. 1, 1997, pp. 63-71, XP002315440.
Kimitoshi Nakazawa, "Margarine, Shortening and Lard", Korin, Aug. 3, 1979, p. 324. (English translation of relevant part).
P. Elisabettini et al., "Symthesis and Physicochemical Characterization of Mixed Diacid Triglycerides That Contain Elaidic Acid", Journal of the American Oil Chemists' Society, 1998, vol. 75(2), pp. 285 to 291, full text.
Tetsuo Koyano et al—Osaka Plant, Meiji Seika Kaisha Ltd., (1-10, Asahi-machi, Takatsuki-shi, 569) Food R & D Laboratories, Meiji Seika Kaisha Ltd., (5-3-1, Chiyoda, Sakado-shi, 350-02) Faculty of Applied Biological Science, Hiroshima University (Saijo-cho, Higashi-Hiroshima-shi, 724)—Physical Properties of Equally Mixed Systems of 1,3-Dioleoyl-2-stearoylglycerol/Cocoa Butter and 1,3-Dioleoyl-2-stearoylglycerol-added Dark Chocolate.

(Continued)

Primary Examiner—Carolyn Paden
(74) Attorney, Agent, or Firm—Young & Thompson

(57) ABSTRACT

A fat composition having a fat phase which, when completely melted at 70° C. and subsequently held at 0° C. for 30 minutes and then at 5° C. for 7 days, gives fat crystals which are β-form crystals of a two-chain-length structure. Even when produced without conducting a special temperature control, the fat composition contains stable crystals, is soft even at low temperatures, and has a wide plasticity range and satisfactory stability with no change in consistency with time. It is especially suitable for use as a roll-in fat composition.

16 Claims, No Drawings

OTHER PUBLICATIONS

R.E. Timms—Research and Development Department, Kempas Edible Oil Sdn. Bhd, P.O. Box 75, Pasir Gudang, Johore, Malaysia—Phase Behaviour of Fats and Their Mixtures—Prog. Lipid Res. vol. 23. pp. 1-38, 1984.

Notice of Rejection Japanese Application 2002-017580 Apr. 7, 2008.
Notice of Rejection Japanese Application 2002-017579 Apr. 7, 2008.

* cited by examiner

FAT COMPOSITION

TECHNICAL FIELD

The present invention relates to a fat and oil composition which is plastic in a broad temperature range, stable against change in hardness with time and particularly suitable for roll-in applications.

BACKGROUND ART

It is said in "Margarine, Shortening and Lard" (Kimitoshi Nakazawa, Korin, Aug. 3, 1979, p 324) that "Margarine and shortening are defined to be plastic substances having crystalline fat at ambient temperature. Their physical properties relate chiefly to consistency, plasticity, and crystal structure. The crystal structures are physically classified into alpha (waxy, like acetoglycerides), beta (coarse crystals), and beta-prime (finely particulate). The melting point increases in the order of alpha, beta-prime, and beta. A preferred crystal structure for margarine and shortening is said to be beta-prime." As so described, fats and oils of β-prime form have been accepted satisfactory and used for plastic fats and oils, such as margarine and shortening.

Fat and oil crystals of β-prime form are fine crystals which contribute emulsion stability to exhibit moderate consistency. On the other hand, because fat and oil crystals of β-prime form are energetically metastable, they are liable to transform to an energetically more stable β form under some conditions, such as improper storage conditions. Crystals of β form, the most stable form, do not transform further but generally have large crystal sizes and easily form coarse crystal grains, called graying or bloom, which give a rough and unpleasant texture and render the products commercially valueless.

There exist crystals of β form transformed from β-prime form and yet having a relatively small crystal size. Cocoa butter of V-form is among them. The V-form cocoa butter consists substantially of β-2 form crystals of symmetric triglycerides, such as SOS and POS. Production of such β form crystals of relatively small size involves an extremely complicated step, such as a special heat treatment called tempering or a step of cooling to a prescribed temperature followed by addition of a specific component as crystal nuclei. Under the present situation, it is impossible to obtain them through rapid cooling plasticization as carried out in the manufacture of ordinary fat and oil compositions. Moreover, cocoa butter of V-form lacks plasticity.

Even fats and oils of the most stable β-prime form have tendency to harden with time and need careful management on crystallization, preservation, and the like.

To address these problems, various inventions have so far been proposed in an attempt to obtain energetically stable and fine crystals. For example, JP-B-51-9763 discloses a process for obtaining β form crystals by specifying the ratio of triglycerides. JP-B-58-13128 teaches a process of suppressing graying of fats and oils by interesterification. JP-A-10-295271 proposes a process in which a high-melting fat and oil is incorporated to maintain the fine crystal form.

The process of JP-B-51-9763 involves tempering for obtaining β form crystals. The compositions obtained by the processes of JP-B-58-13128 and JP-A-10-295271 tend to harden with time and cannot be seen as sufficiently satisfactory in stability as a fat and oil composition. It has turned out that, when the oil phase of a fat and oil composition prepared by any of the disclosed processes is completely melted at 70° C. and maintained at 0° C. for 30 minutes and then at 5° C. for 7 days, the resulting fat and oil crystals are not β form crystals of double chain length structure but β-prime crystals of double chain length structure or β crystals of triple chain length structure.

Although a so-called "compound type" roll-in fat and oil composition which contains milk fat provides a satisfactory flavor, it has a narrow temperature range for plasticity, tending to harden in low temperature and be cut during roll-in, and is not sufficiently satisfactory from the aspect of workability.

DISCLOSURE OF THE INVENTION

An object of the present invention is to provide a fat and oil composition which exhibits plasticity over a broad temperature range, stability against hardening with time, and is particularly suited to roll-in applications.

The present invention accomplishes the above object by providing a fat and oil composition characterized in that, when the oil phase thereof is completely melted at 70° C. and maintained at 0° C. for 30 minutes and then at 5° C. for 7 days, the resulting fat and oil crystals are β form crystals having a double chain length structure.

BEST MODE FOR CARRYING OUT THE INVENTION

The fat and oil composition according to the present invention will hereinafter be described in detail.

The terminology "oil phase" as used herein denotes a fat and oil having, if necessary, added thereto an emulsifier, a colorant, an antioxidant, a flavoring agent, a seasoning, etc. The term "fat(s) and oil(s)" as used herein includes fats extracted from dairy products, fruits, fruit juices, coffee, nut pastes, spices, cocoa mass, cocoa powder, and raw foodstuffs such as grains, beans, vegetables, meats, fishes and sea foods.

The fat and oil composition of the present invention is such that, when the oil phase thereof is completely melted at 70° C. and maintained first at 0° C. for 30 minutes and then at 5° C. for 7 days, preferably at 5° C. for 4 days, still preferably at 5° C. for 1 day, particularly preferably at 5° C. for 1 hour, most preferably at 5° C. for 30 minutes, the resulting fat and oil crystals are β form crystals having a double chain length structure.

Whether the resulting fat and oil crystals are β form crystals having a double chain length structure can be ascertained by, for example, X-ray diffractometry. In X-ray diffractometry, the fat and oil crystals are analyzed for short spacing in a 2θ range of 17 to 26°. Fat and oil crystals which show an intense diffraction peak assigned to a spacing of 4.5 to 4.7 Angstrom are judged to have a β form. The fat and oil crystals are also analyzed for long spacing in a 2θ range of 0 to 8°. Those crystals which show a diffraction peak assigned to a spacing of 40 to 50 Angstrom are judged to have a double chain length structure.

Whether the fat and oil crystals are β form crystals can be confirmed more accurately by measuring the short spacing spectrum in X-ray diffractometry as follows. The short spacing is measured in a 2θ range of 17 to 26°. The intensity of the highest peak appearing in the range corresponding to a spacing of 4.5 to 4.7 Angstrom (peak intensity 1) and the intensity of the highest peak in the range corresponding to a spacing of 4.2 to 4.3 Angstrom (peak intensity 2) are read. Those crystals having a peak intensity 1/peak intensity 2 ratio of 1.3 or greater, preferably 1.7 or greater, still preferably 2.2 or greater, particularly preferably 2.5 or greater, are judged to be β form crystals.

Conventional plastic fats and oils, such as margarines and shortenings, are such that, when their oil phase is completely melted at 70° C. and maintained at 0° C. for 30 minutes and then at 5° C. for 7 days, the resulting fat and oil crystals have a double chain length structure but are of metastable β-prime form. This constitutes a difference from the fat and oil composition of the present invention. Cocoa butter, which finds main use in fat and oil confectionery such as chocolate, is such that, when it is completely melted at 70° C. and maintained at 0° C. for 30 minutes and then at 5° C. for 7 days, the resulting fat and oil crystals have the most stable β form but a triple chain length structure. This is another difference from the fat and oil composition of the present invention.

It is essential for the fat and oil composition of the present invention that the fat and oil crystals resulting from complete melting of its oil phase at 70° C. followed by maintenance at 0° C. for 30 minutes and then at 5° C. for 7 days should be β form crystals having a double chain length structure. Where the oil phase of a fat and oil composition becomes a crystal form other than a β form of double chain length structure, for example, where it comes to most stabilize in a β-prime form, when completely melted at 70° C. and maintained at 0° C. for 30 minutes and then at 5° C. for 7 days, such a fat and oil composition tends to harden with time and would become unfavorable unless placed under meticulous management on crystallization, preservation, and the like.

In the present invention it is preferred that the β form crystals of double chain length structure be substantially fine crystals. The terminology "fine crystals" as used herein means that the fat and oil crystals are small, do not feel rough in the mouth or to the touch, and desirably have sizes of 20 μm or smaller, more desirably 10 μm or smaller, most desirably 3 μm or smaller. The term "size" of crystals indicates the maximum length of crystal grains. Fat and oil crystals whose size exceeds 20 μm tend to feel rough in the mouth or to the touch. The expression "substantially fine crystals" as used above is intended to mean that preferably 90% by weight or more, still preferably 95% by weight or more, most preferably 99% by weight or more, of all the β form crystals having a double chain length structure are "fine crystals".

Fats and oils used in the fat and oil composition of the present invention are by no means limited as long as they provide β form crystals of double chain length structure when completely melted at 70° C. and maintained at 0° C. for 30 minutes and then at 5° C. for 7 days.

Examples of the fats and oils used in the fat and oil composition of the present invention are shown below.

A first group of fats and oils are those comprising a fat and oil (1) containing a triglyceride represented by StEE (wherein St stands for stearic acid, and E stands for elaidic acid). The fat and oil (1) includes processed fats and oils obtained by subjecting one or more of soybean oil, sunflower oil, shea butter, and sal butter to at least one treatment selected from hydrogenation and fractionation. Preferred of them are hydrogenated high-oleic sunflower oil; a hydrogenated oil of a soft fraction of shea butter or a hard fraction of the hydrogenated oil; and a hydrogenated oil of a soft fraction of sal butter or a hard fraction of the hydrogenated oil.

A preferred fat and oil (1) content in the first fats and oils is such that the first fats and oils may contain 5% by weight or more, desirably 10% by weight or more, more desirably 30 to 95% by weight, of the triglyceride represented by StEE.

The first fats and oils may comprise other fats and oils in addition to the fat and oil (1). In this case, the proportion of the other fats and oils in the first fats and oils is preferably 95% by weight or less, still preferably 90% by weight or less, particularly preferably 70% by weight or less. The other fats and oils are not particularly limited as long as they are edible and usable in ordinary processed foods, including natural oils such as animal oils and vegetable oils, hydrogenation products thereof, fractionation products thereof, interesterification products thereof, and random interesterification products thereof, and mixtures thereof.

A second group of fats and oils are those comprising a fat and oil (2) capable of providing compound crystals formed of a triglyceride represented by $S_1MS_2$ (wherein $S_1$ and $S_2$ each represent a saturated fatty acid; and M represents a mono-unsaturated fatty acid) and a triglyceride represented by $MS_3M$ (where $S_3$ represents a saturated fatty acid; and M represents a mono-unsaturated fatty acid).

The saturated fatty acids $S_1$ and $S_2$ in the triglyceride represented by $S_1MS_2$ (hereinafter simply referred to as $S_1MS_2$) and the saturated fatty acid $S_3$ in the triglyceride represented by $MS_3M$ (hereinafter simply referred to as $MS_3M$) are preferably selected from those having 16 or more carbon atoms, still preferably from palmitic acid, stearic acid, arachidic acid, and behenic acid. In the present invention it is the most desirable that $S_1$, $S_2$, and $S_3$ be the same.

The mono-unsaturated fatty acid represented by M in $S_1MS_2$ and that represented by M in $MS_3M$ is preferably one having 16 or more carbon atoms, still preferably one having 18 or more carbon atoms, particularly preferably oleic acid.

The compound crystals formed of $S_1MS_2$ and $MS_3M$ are a compound which results from a mixed system of one $S_1MS_2$ molecule and one $MS_3M$ molecule different in structure and exhibits such crystal behavior as if it consists of triglyceride molecules of a kind. The compound crystals are also designated a molecular compound. The compound crystals are formed by mixing and melting $S_1MS_2$ and $MS_3M$ and cooling the mixture to induce crystallization.

The fat and oil (2) is a mixture of $S_1MS_2$ or an $S_1MS_2$-containing fat and oil and $MS_3M$ or an $MS_3M$-containing fat and oil.

The $S_1MS_2$-containing fat and oil includes various kinds of animal and vegetable fats and oils and processed fats and oils derived therefrom by fractionation, such as shea butter, a shea butter mid fraction, sal butter, a sal butter mid fraction, mango butter, a mango butter mid fraction, illipe butter, an illipe butter mid fraction, cocoa butter, a cocoa butter mid fraction, kokum butter, a kokum butter mid fraction, dhupa butter, a dhupa butter mid fraction butter, mowrah butter, a mowrah butter mid fraction, phulwara butter, a phulwara butter mid fraction, Chinese tallow, a Chinese tallow mid fraction, high-oleic sunflower oil, a high-oleic sunflower mid fraction, palm oil, a palm mid fraction, mango kernel oil, beef tallow, and a beef tallow mid fraction; interesterified oils recited below; and processed fats and oils fractionated from the interesterified oils. In the present invention one or more of these fats and oils are used.

The interesterified oils include those produced from various animal and vegetable fats and oils, such as palm oil, palm kernel oil, coconut oil, corn oil, olive oil, cotton seed oil, soybean oil, rape seed oil, rice oil, sunflower oil, safflower oil, beef tallow, milk fat, lard, cocoa butter, shea butter, mango kernel oil, sal butter, illipe butter, fish oil, and whale oil, and/or processed fats and oils obtained by fractionating these animal and vegetable fats and oils (if necessary after hydrogenation); and those produced using the above-described animal and vegetable fats and oils and/or their processed fats and oils and fatty acids and/or fatty acid lower alcohol esters.

The $MS_3M$-containing fats and oils include lard-based fats and oils and the interesterified oils described below. One or more of them are used in the present invention.

The lard-based fats and oils include lard, a lard soft fraction and a lard mid fraction. One or more of them can be used in the present invention. A lard soft fraction is preferred in the present invention.

A preferred $MS_3M$ content in the lard-based fats and oils is 2.5% by weight or more, particularly 10% by weight or more, especially 20 to 50% by weight. A preferred content of the lard-based fats and oils in the fat and oil composition of the present invention is 10% by weight or more, particularly 30% by weight or more, especially 50 to 95% by weight.

If desired, $MS_3M$ may be added to the lard-based fat and oil. The $MS_3M$ to be added may be any of a naturally occurring $MS_3M$, either as such or as purified by fractionation, and a product obtained by any method, such as interesterification (preferably enzymatically selective interesterification) between a tri-saturated triglyceride (SSS) and a tri-unsaturated triglyceride (MMM) or between a tri-unsaturated triglyceride (MMM) and a saturated fatty acid followed by purification by distillation or fractionation.

The $MS_3M$-containing interesterified oils include those produced from various animal and vegetable fats and oils, such as palm oil, palm kernel oil, coconut oil, corn oil, olive oil, cotton seed oil, soybean oil, rape seed oil, rice oil, sunflower oil, safflower oil, beef tallow, milk fat, lard, cocoa butter, shea butter, mango kernel oil, sal butter, illipe butter, fish oil, and whale oil, and/or processed fats and oils obtained by fractionating these animal and vegetable fats and oils (if necessary after hydrogenation); and those produced using the above-described animal and vegetable fats and oils and/or the processed fats and oils and fatty acids and/or fatty acid lower alcohol esters.

The second fats and oils may comprise other fats and oils in addition to the fat and oil (2). In this case, the proportion of the other fats and oils in the second fats and oils is preferably 95% by weight or less, still preferably 90% by weight or less, particularly preferably 70% by weight or less. The other fats and oils are not particularly limited as long as they are edible and usable in ordinary processed foods, including natural oils such as animal oils and vegetable oils, hydrogenation products thereof, fractionation products thereof, interesterification products thereof, and random interesterification products thereof, and mixtures thereof.

A preferred content of the $S_1MS_2$ or the $S_1MS_2$-containing fat and oil in the second fats and oils is such that the second fats and oils may contain 2.5% by weight or more, desirably 5% by weight or more, more desirably 15 to 50% by weight, of the $S_1MS_2$. A preferred content of the $MS_3M$ or the $MS_3M$-containing fat and oil in the second fats and oils is such that the second fats and oils may contain 2.5% by weight or more, desirably 5% by weight or more, more desirably 15 to 50% by weight, of the $MS_3M$.

A preferred mixing ratio of $MS_3M$ to $S_1MS_2$ in the second fats and oils is 0.4 to 2.5, particularly 0.6 to 1.5, especially 0.8 to 1.2, by mole.

A preferred content of the compound crystals formed of $S_1MS_2$ and $MS_3M$ in the second fats and oils is 5% by weight or more, particularly 10% by weight or more, especially 30 to 95% by weight. Where the content of the compound crystals formed of $S_1MS_2$ and $MS_3M$ in the second fats and oils is less than 5% by weight, β form crystals exceeding 20 μm in size are apt to develop with time so that a fat and oil composition containing such compounded fats and oils tends to harden with time.

A preferred content of the first fats and oils in the fat and oil composition of the present invention is 5 to 95% by weight, particularly 15 to 85% by weight, especially 30 to 70% by weight. A preferred content of the second fats and oils in the fat and oil composition of the present invention is 5 to 95% by weight, particularly 15 to 85% by weight, especially 30 to 70% by weight.

The fat and oil composition of the present invention can be made more pleasant in flavor by incorporating milk fat. A recommended milk fat content in the fat and oil composition of the present invention is 1 to 95% by weight, preferably 5 to 50% by weight, still preferably 10 to 30% by weight. With a milk fat content of less than 1% by weight, a pleasant flavor is hard to obtain. A milk fat content exceeding 95% by weight tends to cause the fat and oil composition to harden in low temperature, that is, tends to narrow a temperature range in which plasticity is assured.

Milk fat to be added may be either a milk fat-containing dairy product, e.g., milk, cream, butter or cheese, or milk fat extracted from these dairy products. A hard fraction, a mid fraction, a soft fraction, etc. of milk fat obtained by dry fractionation or solvent fractionation of milk fat are also useful.

Other ingredients that can be incorporated into the fat and oil composition of the present invention include foods and food additives, such as water, emulsifiers, thickening stabilizers, salting agents, e.g., sodium chloride and potassium chloride, souring agents, e.g., acetic acid, lactic acid, and gluconic acid, sweetening agents, e.g., sugars, sugar alcohols, stevia, and aspartame, coloring agents, e.g., β-carotene, caramel, and ang-khak pigment, antioxidants, e.g., tocopherol and tea extract, plant proteins, e.g., gluten and soy protein, eggs and various egg products, flavoring agents, dairy products, seasonings, pH adjustors, food preservatives, microbiostats, fruit, fruit juice, coffee, nut paste, spices, cocoa mass, cocoa powder, grains, beans, vegetables, meats, fishes, and sea foods.

The emulsifiers include glycerol fatty acid esters, sucrose fatty acid esters, sorbitan fatty acid esters, propylene glycol fatty acid esters, glycerol organic acid fatty acid esters, polyglycerol fatty acid esters, polyglycerol condensed ricinoleic esters, calcium stearoyl lactate, sodium stearoyl lactate, polyoxyethylene fatty acid esters, polyoxyethylene sorbitan fatty acid esters, lecithin, and saponin. One or more of these emulsifiers can be used. The amount of the emulsifier to be added is preferably, but not limited to, 0.05 to 3% by weight, still preferably 0.1 to 1% by weight, based on the fat and oil composition of the present invention. The emulsifier does not need to be added where unnecessary.

The thickening stabilizers include guar gum, locust bean gum, carrageenan, gum arabic, alginic acids, pectin, xanthan gum, pullulan, tamarind seed gum, psyllium seed gum, crystalline cellulose, carboxymethyl cellulose, methyl cellulose, agar, glucomannan, gelatin, starch, and modified starch. One or more of them can be used in the invention. The amount of the thickening stabilizers to be added is preferably, but not limited to, 0 to 10% by weight, still preferably 0 to 5% by weight, based on the fat and oil composition of the present invention. The thickening stabilizer does not need to be added where unnecessary.

The process for preparing the fat and oil composition according to the present invention will then be described.

The fat and oil composition of the invention is obtainable by melting and cooling an oil phase which becomes fat and oil crystals of β form having a double chain length structure when completely melted at 70° C. and maintained at 0° C. for 30 minutes and then at 5° C. for 7 days.

More specifically, a fat and oil which becomes β form crystals having a double chain length structure when completely melted at 70° C. and maintained at 0° C. for 30 minutes and then at 5° C. for 7 days is, if desired, mixed with other ingredients and melted. The fat and oil (or the mixture) is preferably sterilized. Sterilization can be carried out either batchwise in a tank or continuously by use of a plate heat exchanger or a scrape heat exchanger. Plasticization by cooling preferably follows. Cooling is preferably carried out at a rate of −0.5° C./min or higher, particularly −5° C./min or higher. While rapid cooling is preferable to slow cooling, a fat and oil composition having a broad temperature range for plasticity and exhibiting excellent extensibility in low temperature and stability against hardening with time can be obtained by slow cooling as well. Cooling equipment includes closed continuous tubular cooling apparatus such as margarine processing equipment, e.g., a votator, a combinator, and a perfector; plate heat exchangers; and a combination of a diacooler and a complector.

If desired, nitrogen gas, air, etc. may be incorporated into the product in any stage involved in the production of the fat and oil composition.

The fat and oil composition of the invention is preferably a plastic one, which may be of either margarine type or shortening type. The emulsification form may be any of a water-in-oil, an oil-in-water, and a double emulsion system.

Applications of the fat and oil composition of the invention include dough mixing, roll-in, filling, sandwich making, topping, spreading, spraying, coating, frying, and cream preparation. The fat and oil composition is suited for use in bakery products, such as loaves, sweet goods, Danish pastries, pies, chou, doughnuts, cakes, cookies, hard biscuits, waffles, and scones. The amount of the fat and oil composition to be used in these applications varies according to the use and is not particularly limited.

The fat and oil composition of the present invention is particularly suited for use as a roll-in fat and oil composition. For use as a roll-in fat and oil composition, the composition can be shaped into sheets, blocks, columns, and so forth. Suitable sizes are: 50 to 1000 mm wide, 50 to 1000 mm long, and 1 to 50 mm thick for sheets; 50 to 1000 mm wide, 50 to 1000 mm long, and 50 to 500 mm thick for blocks; and 1 to 25 mm in diameter and 5 to 100 mm in length for columns.

The roll-in fat and oil composition according to the present invention is prepared so that the fat and oil in the oil phase preferably has a solid fat content (SFC) of 20 to 60% at 10° C. and 10 to 40% at 20° C., particularly 20 to 50% at 10° C. and 10 to 20% at 20° C. Where the SFC is less than 20% at 10° C. or less than 10% at 20° C., the composition is too soft as a roll-in fat and oil composition, tending to fail to provide pastries with good puffiness. Where the SFC exceeds 60% at 10° C. or exceeds 40% at 20° C., the resulting composition tends to have poor extensibility and fail to remain plastic over a wide temperature range.

The SFC is measured as follows. The fat and oil to be used in the fat and oil composition is completely melted by maintaining at 60° C. for 30 minutes, solidified by maintaining at 0° C. for 30 minutes, tempered by maintaining at 25° C. for 30 minutes, and finally maintained at 0° C. for 30 minutes. The SFC is measured after the resulting fat and oil is maintained at the SFC measuring temperature for 30 minutes.

The roll-in fat and oil composition of the present invention preferably contains a high-melting fat and oil. A high-melting fat and oil improves heat-resistant shape retention of the roll-in fat and oil composition. In roll-in applications (for Danish dough making), a high-melting fat and oil improves extensibility of dough in final proof.

The high-melting fat and oil preferably has a melting point of 40° C. or higher, particularly 50° C. or higher, especially 55 to 80° C. With a fat and oil whose melting point is lower than 40° C., it is difficult to secure sufficient extensibility of dough in final proof.

The amount of the high-melting fat and oil to be added is preferably 0 to 30% by weight, still preferably 0 to 10% by weight, particularly preferably 0 to 5% by weight based on the total amount of the oil and fat in the roll-in fat and oil composition of the present invention. Addition of more than 30% by weight of the high-melting fat and oil is apt to reduce a melting mouthfeel.

Examples of the high-melting fat and oil include palm oil; cocoa butter; processed fats and oils obtained from various animal and vegetable fats and oils, such as palm kernel oil, coconut oil, corn oil, olive oil, cotton seed oil, soybean oil, rape seed oil, rice oil, sunflower oil, safflower oil, beef tallow, milk fat, lard, shea butter, mango kernel oil, sal butter, illipe butter, fish oil, and whale oil, by at least one treatment selected from hydrogenation, fractionation, and interesterification; and interesterification products obtained from these animal and vegetable fats and oils and/or their processed fats and oils and fatty acids and/or fatty acid lower alcohol esters.

The roll-in fat and oil composition of the present invention is suitably used in pastries including Danish, croissant, pies, and fried pies. The amount of the roll-in fat and oil composition to be used in these applications varies according to the use and is not particularly limited.

The present invention will now be illustrated in greater detail with reference to Examples, but it should be understood the invention is not deemed to be limited thereto. In Examples, St stands for stearic acid; E, elaidic acid; O, oleic acid; P, palmitic acid; S, a saturated fatty acid; and M, a mono-unsaturated fatty acid.

EXAMPLE 1

High-oleic sunflower oil was isomerized and hydrogenated in the presence of DL-methionine to obtain a hydrogenated oil (a) having a melting point of 40° C. The hydrogenated oil (a) was melted at 60° C. and cooled to 0° C. for crystallization. DSC analysis on crystal transformation revealed direct transformation into β crystals, the most stable form, without experiencing a β-prime form. For confirmation, the hydrogenated oil (a) was completely melted at 70° C., maintained at 0° C. for 30 minutes and then at 5° C. for 30 minutes, and the resulting fat and oil crystals were analyzed by X-ray diffractometry in a 2θ range of 17 to 26°. The intensity of the highest peak corresponding to a spacing of 4.6 Angstrom (peak intensity 1) and the intensity of the highest peak corresponding to a spacing of 4.2 Angstrom (peak intensity 2) were read. The peak intensity 1/peak intensity 2 ratio was found to be 3.6, which proved that the fat and oil crystals had a β form. Furthermore, X-ray diffraction pattern in a 2θ range of 0 to 8° showed a diffraction peak corresponding to 45 Angstrom, proving that the triglyceride molecules were in a double chain length packing configuration. The fat and oil crystals were found to be fine crystals of 3 μm or smaller as observed under an optical microscope.

The hydrogenated oil (a) contained 25% by weight of a triglyceride represented by StEE.

A mixture of 70% by weight of the hydrogenated oil (a) and 30% by weight of soybean oil was melted at 60° C. to prepare a compounded oil. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (A), which was plasticized by rapid cooling at a rate of −20° C./min or higher to obtain a margarine type fat and oil composition.

It was confirmed under an optical microscope that the resulting fat and oil composition contained fine fat and oil crystals of 3 μm or smaller. The oil phase of the fat and oil composition was analyzed by X-ray diffractometry under the same conditions as described above. As a result, the ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 3.3, proving the fine fat and oil crystals to be β crystals. A diffraction peak also appeared at 45 Angstrom to confirm that the crystals had a double chain length structure. The fat and oil composition was soft in low temperature, with a rheometer reading 1000 g/cm$^2$ at 5° C., that is, exhibited plasticity over a wide temperature range. After an elapse of one month from the preparation, the rheometer's reading at 5° C. was still 1000 g/cm$^2$, which demonstrated stability against change in hardness with time.

EXAMPLE 2

A margarine type fat and oil composition was prepared by plasticizing the emulsion (A) used in Example 1 by slow cooling at a rate of −1° C./min, whereas a generally adopted cooling rate in a rapid cooling step is −20° C./min or higher.

It was confirmed under an optical microscope that the resulting fat and oil composition contained fine fat and oil crystals of 3 μm or smaller. The oil phase of the fat and oil composition was analyzed by X-ray diffractometry under the same conditions as in Example 1. As a result, the ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 3.1, proving the fine fat and oil crystals to be β crystals. A diffraction peak also appeared at 45 Angstrom to confirm that the crystals had a double chain length structure. The fat and oil composition was soft in low temperature, with a rheometer reading 1200 g/cm$^2$ at 5° C., that is, exhibited plasticity over a wide temperature range. After an elapse of one month from the preparation, the rheometer's reading at 5° C. was still 1200 g/cm$^2$, which demonstrated stability against hardening with time.

EXAMPLE 3

Seventy percent by weight of the hydrogenated oil (a) used in Example 1 and 30% by weight of soybean oil were mixed and melted at 60° C. to obtain a compounded oil. The compounded oil was plasticized by rapid cooling at a rate of −20° C. or higher to prepare a shortening type fat and oil composition.

It was confirmed under an optical microscope that the resulting fat and oil composition contained fine fat and oil crystals of 3 μm or smaller. The oil phase of the fat and oil composition was analyzed by X-ray diffractometry under the same conditions as in Example 1. As a result, the ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 3.5, proving the fine fat and oil crystals to be β crystals. A diffraction peak also appeared at 45 Angstrom to confirm that the crystals had a double chain length structure. The fat and oil composition was soft in low temperature, with a rheometer reading 1100 g/cm$^2$ at 5° C., that is, exhibited plasticity over a wide temperature range. After an elapse of one month from the preparation, the rheometer's reading at 5° C. was still 1100 g/cm$^2$, which demonstrated stability against hardening with time.

EXAMPLE 4

A mixture of 64 wt % of the hydrogenated oil (a) used in Example 1, 20 wt % of milk fat, and 16% by weight of soybean oil was melted at 60° C. to prepare a compounded oil. The SFC of the compounded oil was 39% at 10° C. and 26% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (B), which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

In the measurement of SFCs of the compounded oil, the compounded oil was maintained at 60° C. for 30 minutes for complete melting, 0° C. for 30 minutes for solidification, 25° C. for 30 minutes for tempering, and finally at 0° C. for 30 minutes. Then, the compounded oil was maintained at the SFC measuring temperature for 30 minutes and then measured for the SFC (hereinafter the same).

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as in Example 1 to confirm that the fat and oil crystals were β crystals of double chain length structure. The roll-in fat and oil composition was soft in low temperature, with a rheometer reading 2800 g/cm$^2$ at 5° C., that is, exhibited plasticity and excellent extensibility over a wide temperature range. After an elapse of one month from the preparation, the rheometer's reading at 5° C. was still 2800 g/cm$^2$, which demonstrated stability against change in hardness with time.

Pastries were made using the roll-in fat and oil composition according to the following formulation and method. The lifts (thickness after baking/thickness before baking) of the resulting 10 pastries averaged 11.2, proving the pastries puffy.

| Formulation: | |
| --- | --- |
| Bread flour | 70 parts by weight |
| Cake flour | 30 parts by weight |
| Sodium chloride | 1.3 part by weight |
| Sugar | 2 parts by weight |
| Skim milk powder | 3 parts by weight |
| In-dough fat and oil | 5 parts by weight |
| Water | 54 parts by weight |
| Roll-in fat and oil composition | 80 parts by weight |

Method of Making Pastry:

The ingredients other than the roll-in fat and oil composition were mixed in a vertical mixer at a low speed and then at a medium speed, and the resulting dough was retarded in a refrigerator. The roll-in fat and oil composition was put on the retarded dough and rolled in (four times of folding each into quarters) in a usual manner, and the layered dough was shaped (100 mm wide, 100 mm long, 3 mm thick), and baked.

EXAMPLE 5

A margarine type roll-in fat and oil composition was prepared by plasticizing the emulsion (B) used in Example 4 by slow cooling at a rate of −1° C./min, whereas a generally adopted cooling rate in a rapid cooling step is −20° C./min or higher. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as in Example 1 to confirm that the fat and oil crystals were β crystals of double chain length structure. The roll-in fat and oil composition was soft in low temperature, with a rheometer reading 3000 g/cm$^2$ at 5° C., that is, exhibited plasticity and excellent extensibility over a wide temperature range. After an elapse of one month from the preparation, the rheometer's reading at 5° C. was still 3000 g/cm$^2$, which demonstrated stability against change in hardness with time.

Pastries were made using the roll-in fat and oil composition according to the same formulation and method as used in Example 4. The lifts of the resulting pastries averaged 10.7, as measured in the same manner as in Example 4, proving the pastries puffy.

EXAMPLE 6

A shea soft fraction was hydrogenated using a nickel catalyst to obtain a hydrogenated oil (b) having an iodine value of 59. The hydrogenated oil (b) was melted at 60° C. and cooled to 0° C. for crystallization. DSC analysis on crystal transformation revealed direct transformation into β crystals, the most stable form, without experiencing a β-prime form. For confirmation, the hydrogenated oil (b) was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were fine crystals of 3 μm or smaller as observed under an optical microscope.

The hydrogenated oil (b) contained 15% by weight of a triglyceride represented by StEE.

A mixture of 51% by weight of the hydrogenated oil (b), 15% by weight of milk fat, and 34% by weight of soybean oil was melted at 60° C. to prepare a compounded oil. The SFC of the compounded oil was 36% at 10° C. and 28% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (C), which was plasticized by rapid cooling at a rate of −20° C./min or higher to obtain a margarine type roll-in fat and oil composition. The resulting roll-in fat and oil composition was shaped into a sheet of 285 mm in width, 420 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 2700 g/cm$^2$ at 5° C., that is, exhibited plasticity and excellent extensibility over a wide temperature range. After an elapse of one month from the preparation, the rheometer's reading at 5° C. was still 2700 g/cm$^2$, which demonstrated stability against change in hardness with time.

Pastries were made using the roll-in fat and oil composition according to the same formulation and method as used in Example 4. The lifts of the resulting pastries averaged 14.9 as measured in the same manner as in Example 4, proving the pastries puffy.

EXAMPLE 7

A sal soft fraction was isomerized and hydrogenated in the presence of DL-methionine to obtain a hydrogenated oil having an iodine value of 54. The hydrogenated oil was dry fractionated to obtain a hard fraction (c). The hard fraction (c) was melted at 60° C. and cooled to 0° C. for crystallization. DSC analysis on crystal transformation revealed direct transformation into β crystals, the most stable form, without experiencing a β-prime form. For confirmation, the hard fraction (c) was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found under an optical microscope to be fine crystals of 3 μm or smaller.

The hard fraction (c) contained 36% by weight of a triglyceride represented by StEE.

A mixture of 30% by weight of the hard fraction (c), 25% by weight of milk fat, and 45% by weight of soybean oil was melted at 60° C. to prepare a compounded oil. The SFC of the compounded oil was 34% at 10° C. and 24% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (D), which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 1300 g/cm$^2$ at 5° C., that is, exhibited plasticity and excellent extensibility over a wide temperature range. After an elapse of one month from the preparation, the rheometer's reading at 5° C. was still 1300 g/cm$^2$, which demonstrated stability against change in hardness with time.

Pastries were made using the roll-in fat and oil composition according to the same formulation and method as used in Example 4. The lifts of the resulting pastries averaged 10.5 as measured in the same manner as in Example 4, proving the pastries puffy.

EXAMPLE 8

Highly hydrogenated soybean oil and ethyl oleate were mixed in a weight ratio of 2:3, melted, and subjected to interesterification in the presence of a sodium methoxide catalyst. Fatty acids were removed from the reaction product by molecular distillation, and the resultant fats and oils were fractionated and purified to obtain a soft fraction. The soft fraction contained 60% by weight of a triglyceride represented by OStO.

Fifty weight percent of the soft fraction was mixed with 50 wt % of a mango kernel mid fraction containing 60 wt % of a triglyceride represented by StOSt, and the mixture was melted at 60° C. to obtain a mixed oil (d).

The mixed oil (d) was melted at 60° C. and cooled to 0° C. to crystallize. DSC analysis on crystal transformation revealed direct transformation into β crystals, the most stable form, without experiencing a β-prime form. For confirmation, the mixed oil (d) was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, an X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (d) contained 30 wt % of a triglyceride represented by StOSt and 30 wt % of a triglyceride represented by OStO.

A mixture of 50 wt % of the mixed oil (d), 30 wt % of milk fat, and. 20 wt % of soybean oil was melted at 60° C. to prepare a compounded oil. The SFC of the compounded oil was 40% at 10° C. and 20% at 20° C. The compounded oil had a triglyceride StOSt content of 15 wt %, and a triglyceride OStO content of 15 wt %. The triglyceride OStO to triglyceride StOSt molar ratio was 1.0. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (E), which was plasticized is by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 1750 g/cm² at 5° C., that is, exhibited plasticity and excellent extensibility over a wide temperature range. After an elapse of one month from the preparation, the rheometer's reading at 5° C. was still 1750 g/cm², which demonstrated stability against change in hardness with time.

Pastries were made using the roll-in fat and oil composition according to the same formulation and method as used in Example 4. The lifts of the resulting pastries averaged 13.6 as measured in the same manner as in Example 4, proving the pastries puffy.

EXAMPLE 9

A fish oil was hydrogenated in the presence of a nickel catalyst to obtain a hydrogenated fish oil having a melting point of 30° C. The hydrogenated fish oil was melted at 60° C. and cooled to 0° C. for crystallization. DSC analysis on crystal transformation revealed that the fat and oil had a β-prime crystal form. For confirmation, the hydrogenated fish oil was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.2 Angstrom, proving that the fat and oil crystals had a β-prime form.

A mixture of 63 wt % of the hydrogenated fish oil, 27 wt % of the hydrogenated oil (a) used in Example 1, and 10 wt % of milk fat was melted at 60° C. to prepare a compounded oil. The SFC of the compounded oil was 39% at 10° C. and 26% at 20° C. The compounded oil was plasticized by rapid cooling at a rate of −20° C./min or higher to obtain a shortening type roll-in fat and oil composition. The resulting roll-in fat and oil composition was shaped into a sheet of 210 mm in width, 210 mm in length, and 13 mm in thickness.

It was confirmed under an optical microscope that the resulting roll-in fat and oil composition contained fine fat and oil crystals of 3 μm or smaller. The roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 1900 g/cm² at 5° C., that is, exhibited plasticity and excellent extensibility over a wide temperature range. After an elapse of one month from the preparation, the rheometer's reading at 5° C. was still 1900 g/cm², which demonstrated stability against change in hardness with time.

Pastries were made using the roll-in fat and oil composition according to the same formulation and method as used in Example 4. The lifts of the resulting pastries averaged 10.7 as measured in the same manner as in Example 4, proving the pastries puffy.

EXAMPLE 10

The water-in-oil emulsion (B) used in Example 4 was plasticized by rapid cooling at a rate of −20° C./min or higher in the same manner as in Example 4 to obtain a margarine type roll-in fat and oil composition. The resulting roll-in fat and oil composition was shaped into columns of 5 mm in diameter and 40 mm in length.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as in Example 1 to confirm that the fat and oil crystals were β crystals of double chain length structure. The roll-in fat and oil composition was soft in low temperature, with a rheometer reading 2500 g/cm² at 5° C., that is, exhibited plasticity and excellent extensibility over a wide temperature range. After an elapse of one month from the preparation, the rheometer's reading at 5° C. was still 2500 g/cm², which demonstrated stability against change in hardness with time.

Pastries were made using the roll-in fat and oil composition according to the same formulation as in Example 4 and the following method of making. The lifts of the resulting pastries averaged 11.5 as measured in the same manner as in Example 4, proving the pastries puffy.

Method of Making Pastry:

The ingredients other than the roll-in fat and oil composition were mixed in a vertical mixer at a low speed and then at a medium speed. The roll-in fat and oil composition was added thereto, followed by mixing at a low speed to obtain dough. The resulting dough was retarded in a refrigerator. The retarded dough was folded (four times of folding each into quarters) in a usual manner, and the layered dough was shaped (100 mm wide, 100 mm long, 3 mm thick) and baked.

EXAMPLE 11

Seventeen weight percent of a shea mid fraction containing 83 wt % of a triglyceride represented by StOSt and 83 wt % of lard containing 17 wt % of a triglyceride represented by OPO were mixed and melted at 60° C. to obtain a mixed oil (e).

The mixed oil (e) was melted at 60° C. and cooled to 0° C. to crystallize. DSC analysis on crystal transformation revealed direct transformation into β crystals, the most stable form, without experiencing a β-prime form. For confirmation, the mixed oil (e) was completely melted at 70° C., maintained at 0° C. for 30 minutes and then at 5° C. for 30 minutes, and the precipitated fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be crystals of 3 μm or smaller under an optical microscope.

The mixed oil (e) contained 14 wt % of a triglyceride represented by StOSt and 14 wt % of a triglyceride represented by OPO.

A mixture of 40 wt % of the mixed oil (e), 40 wt % of milk fat, and 20 wt % of soybean oil was melted at 60° C. to prepare a compounded oil. The SFC of the compounded oil was 32% at 10° C. and 19% at 20° C. The compounded oil had a triglyceride StOSt content of 6 wt %, and a triglyceride OPO content of 6 wt %. The triglyceride OPO to triglyceride StOSt molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (F), which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 2650 g/cm² at 5° C., that is, exhibited plasticity and excellent extensibility over a wide temperature range. After an elapse of one month from the preparation, the rheometer's reading at 5° C. was still 2650 g/cm², which demonstrated stability against change in hardness with time.

Pastries were made using the roll-in fat and oil composition according to the same formulation and method as used in Example 4. The lifts of the resulting pastries averaged 12.3 as measured in the same manner as in Example 4, proving the pastries puffy.

EXAMPLE 12

Twenty-three weight percent of a sal mid fraction containing 57 wt % of a triglyceride represented by StOSt and 77 wt % of a lard soft fraction containing 17 wt % of a triglyceride represented by OPO were mixed and melted at 60° C. to obtain a mixed oil (f).

The mixed oil (f) was melted at 60° C. and cooled to 0° C. to crystallize. DSC analysis on crystal transformation revealed direct transformation into β crystals, the most stable form, without experiencing a β-prime form. For confirmation, the mixed oil (f) was completely melted at 70° C., maintained at 0° C. for 30 minutes and then at 5° C. for 30 minutes, and the precipitated fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (f) contained 13 wt % of a triglyceride represented by StOSt and 13 wt % of a triglyceride represented by OPO.

A mixture of 50 wt % of the mixed oil (f), 25 wt % of milk fat, and 25 wt % of soybean oil was melted at 60° C. to prepare a compounded oil. The SFC of the compounded oil was 30% at 10° C. and 18% at 20° C. The compounded oil had a triglyceride StOSt content of 7 wt % and a triglyceride OPO content of 7 wt %. The triglyceride OPO to triglyceride StOSt molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (G), which was plasticized by rapid cooling at a rate of −20° C./min or higher to obtain a margarine type roll-in fat and oil composition. The resulting roll-in fat and oil composition was shaped into a sheet of 285 mm in width, 420 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 1970 g/cm² at 5° C., that is, exhibited plasticity and excellent extensibility over a wide temperature range. After an elapse of one month from the preparation, the rheometer's reading at 5° C. was still 1970 g/cm², which demonstrated stability against change in hardness with time.

Pastries were made using the roll-in fat and oil composition according to the same formulation and method as used in Example 4. The lifts of the resulting pastries averaged 12.4 as measured in the same manner as in Example 4, proving the pastries puffy.

EXAMPLE 13

Twenty-two weight percent of a palm mid fraction containing 60 wt % of a triglyceride represented by POP and 78 wt % of lard containing 17 wt % of a triglyceride represented by OPO were mixed and melted at 60° C. to obtain a mixed oil (g).

The mixed oil (g) was melted at 60° C. and cooled to 0° C. to crystallize. DSC analysis on crystal transformation revealed direct transformation into β crystals, the most stable form, without experiencing a β-prime form. For confirmation, the mixed oil (g) was completely melted at -70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (g) contained 13 wt % of a triglyceride represented by POP and 13 wt % of a triglyceride represented by OPO.

A mixture of 40 wt % of the mixed oil (g), 14 wt % of milk fat, 5 wt % of highly hydrogenated soybean oil, 35 wt % of soybean oil, and 6 wt % of the hydrogenated fish oil used in Example 9 was melted at 60° C. to prepare a compounded oil. The SFC of the compounded oil was 30% at 10° C. and 22% at 20° C. The compounded oil had a triglyceride POP content of 5 wt %, and a triglyceride OPO content of 5 wt %. The triglyceride OPO to triglyceride POP molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (H), which was plasticized by rapid cooling at a rate of −20° C./min or higher to obtain a margarine type roll-in fat and oil composition. The resulting roll-in fat and oil composition was shaped into a sheet of 300 mm in width, 450 mm in length, and 14 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 2460 g/cm² at 5° C., that is, exhibited plasticity and excellent extensibility over a wide temperature range. After an elapse of one month from the preparation, the rheometer's reading at 5° C. was still 2460 g/cm², which demonstrated stability against change in hardness with time.

Pastries were made using the roll-in fat and oil composition according to the same formulation and method as used in Example 4. The lifts of the resulting pastries averaged 14.4 as measured in the same manner as in Example 4, proving the pastries puffy.

EXAMPLE 14

Forty-four weight percent of palm oil containing 22 wt % triglyceride represented by POP and 56 wt % of lard containing 17 wt % triglyceride represented by OPO were mixed and melted at 60° C. to obtain a mixed oil (h).

The mixed oil (h) was melted at 60° C. and cooled to 0° C. to crystallize. DSC analysis on crystal transformation revealed direct transformation into β crystals, the most stable form, without experiencing a β-prime form. For confirmation, the mixed oil (h) was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (h) contained 10 wt % of a triglyceride represented by POP and 10 wt % of a triglyceride represented by OPO.

A mixture of 50 wt % of the mixed oil (h), 30 wt % of milk fat, and 20 wt % of soybean oil was melted at 60° C. to prepare a compounded oil. The SFC of the compounded oil was 32% at 10° C. and 15% at 20° C. The compounded oil had a triglyceride POP content of 5 wt % and a triglyceride OPO content of 5 wt %. The triglyceride OPO to triglyceride POP molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (I), which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 2190 g/cm² at 5° C., that is, exhibited plasticity and excellent extensibility over a wide temperature range. After an elapse of one month from the preparation, the rheometer's reading at 5° C. was still 2190 g/cm², which demonstrated stability against change in hardness with time.

Pastries were made using the roll-in fat and oil composition according to the same formulation and method as used in Example 4. The lifts of the resulting pastries averaged 11.7 as measured in the same manner as in Example 4, proving the pastries puffy.

EXAMPLE 15

Shea stearin and high-oleic sunflower oil were mixed at a weight ratio of 1:1, melted, and subjected to interesterification using a 1,3-selective enzyme. The reaction product was fractionated and purified to obtain a soft fraction. The soft fraction contained 36% by weight of a triglyceride represented by OStO. Thirty-eight weight percent of the soft fraction was mixed with 62 wt % of palm oil containing 22 wt % triglyceride represented by POP, and the mixture was melted at 60° C. to obtain a mixed oil (i).

The mixed oil (i) was melted at 60° C. and cooled to 0° C. to crystallize. DSC analysis on crystal transformation revealed direct transformation into β crystals, the most stable form, without experiencing a β-prime form. For confirmation, the mixed oil (i) was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (i) contained 14 wt % of a triglyceride represented by POP and 14 wt % of a triglyceride represented by OStO.

A mixture of 65 wt % of the mixed oil (i), 20 wt % of milk fat, and 15 wt % of soybean oil was melted at 60° C. to prepare a compounded oil. The SFC of the compounded oil was 28% at 10° C. and 11% at 20° C. The compounded oil had a triglyceride POP content of 9 wt %, and a triglyceride OStO content of 9 wt %. The triglyceride OStO to triglyceride POP molar ratio was 0.9. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (J), which was plasticized by rapid cooling at a rate of −20° C./min or higher to obtain a margarine type roll-in fat and oil composition. The resulting roll-in fat and oil composition was shaped into a sheet of 285 mm in width, 420 mm in length, and 18 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 2770 g/cm$^2$ at 5° C., that is, exhibited plasticity and excellent extensibility over a wide temperature range. After an elapse of one month from the preparation, the rheometer's reading at 5° C. was still 2770 g/cm$^2$, which demonstrated stability against change in hardness with time.

Pastries were made using the roll-in fat and oil composition according to the same formulation and method as used in Example 4. The lifts of the resulting pastries averaged 12.0 as measured in the same manner as in Example 4, proving the pastries puffy.

EXAMPLE 16

Palm stearin and high-oleic rape seed oil were mixed at a weight ratio of 4:6, melted, and subjected to interesterification using a chemical catalyst. The reaction product was purified to obtain an interesterified fat and oil. The interesterified fat and oil contained 12 wt % of a triglyceride represented by OPO. Eighty-four weight percent of the interesterified fat and oil was mixed with 16 wt % of a palm mid fraction containing 60 wt % of a triglyceride represented by POP, and the mixture was melted at 60° C. to obtain a mixed oil (j).

The mixed oil (j) was melted at 60° C. and cooled to 0° C. to crystallize. DSC analysis on crystal transformation revealed direct transformation into β crystals, the most stable form, without experiencing a β-prime form. For confirmation, the mixed oil (j) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

The mixed oil (j) contained 10 wt % of a triglyceride represented by POP and 10 wt % of a triglyceride represented by OPO.

A mixture of 35 wt % of the mixed oil 6), 30 wt % of milk fat, and 35 wt % of soybean oil was melted at 60° C. to prepare a compounded oil. The SFC of the compounded oil was 23% at 10° C. and 12% at 20° C. The compounded oil had a triglyceride POP content of 4 wt %, and a triglyceride OPO content of 4 wt %. The triglyceride OPO to triglyceride POP molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (K), which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

It was confirmed under an optical microscope that the resulting roll-in fat and is oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was soft in low temperature, with a rheometer reading 1240 g/cm$^2$ at 5° C., that is, exhibited plasticity and excellent extensibility over a wide temperature range. After an elapse of one month from the preparation, the rheometer's reading at 5° C. was still 1240 g/cm$^2$, which demonstrated stability against change in hardness with time.

Pastries were made using the roll-in fat and oil composition according to the same formulation and method as used in Example 4. The lifts of the resulting pastries averaged 10.8 as measured in the same manner as in Example 4, proving the pastries puffy.

EXAMPLE 17

Seventy-seven weight percent of a lard soft fraction and 23% by weight of a sal butter mid fraction were mixed to obtain a mixed oil (k) containing 13 wt % of a triglyceride represented by SMS and 13 wt % of a triglyceride represented by MSM. The mixed oil (k) was melted at 60° C. and cooled to 0° C. to crystallize. DSC analysis on crystal transformation revealed direct transformation into β crystals, the most stable form, without experiencing a β-prime form. For confirmation, the mixed oil (k) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

Fifty weight percent of the mixed oil (k), 25 wt % of milk fat, and 25 wt % of soybean oil were melted at 60° C. to prepare a compounded oil. The SFC of the compounded oil was 30% at 10° C. and 18% at 20° C. The compounded oil had a triglyceride SMS content of 7 wt %, and a triglyceride MSM content of 7 wt %. The triglyceride SMS to triglyceride MSM molar ratio was 1.0.

An oil phase was prepared by mixing and melting 81.5 wt % of the compounded oil with 2.0 wt % of a sorbitan fatty acid ester and 0.5 wt % of a glycerol fatty acid ester as emulsifiers. To 16 wt % of water was added 84 wt % of the oil phase and emulsified to form an oil-in-water emulsion (L), which was solidified at 5° C. to obtain a phase-inverted margarine type roll-in fat and oil composition. The resulting roll-in fat and oil composition was shaped into a block of 250 mm in width, 340 mm in length, and 215 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals of double chain length structure. The roll-in fat and oil composition was excellent in extensibility, with a rheometer's reading of 600 g/cm² at 5° C. After an elapse of one month from the preparation, the rheometer's reading at 5° C. was still 600 g/cm², which demonstrated stability against change in hardness with time.

Pastries were made using the roll-in fat and oil composition cut into 2 cm-side cubes according to the following formulation and method. The lifts of the resulting pastries averaged 12.4 as measured in the same manner as in Example 4, proving the pastries puffy.

| Formulation: | |
|---|---|
| Bread flour | 70 parts by weight |
| Cake flour | 30 parts by weight |
| Sodium chloride | 1.3 part by weight |
| Sugar | 2 parts by weight |
| Skim milk powder | 3 parts by weight |
| Water | 54 parts by weight |
| Roll-in fat and oil composition | 85 parts by weight |

Method of Making Pastry:

The ingredients other than water and sodium chloride were mixed in a vertical mixer at a low speed. Water in which sodium chloride had been dissolved was added thereto, followed by mixing at a low speed and then at a medium speed. The resulting dough was retarded in a refrigerator. The retarded dough was given four times folding each into quaters, shaped (100 mm wide, 100 mm long, 3 mm thick), and baked.

EXAMPLE 18

Seventy-nine weight percent of lard and 21% by weight of a palm mid fraction were mixed to obtain a mixed oil (1) containing 16 wt % of a triglyceride represented by SMS and 16 wt % of a triglyceride represented by MSM. The mixed oil (1) was melted at 60° C. and cooled to 0° C. to crystallize. DSC analysis on crystal transformation revealed direct transformation into β crystals, the most stable form, without experiencing a β-prime form. For confirmation, the mixed oil (I) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. The fat and oil crystals were found to be fine crystals of 3 μm or smaller under an optical microscope.

Fifteen weight percent of the mixed oil (1), 75 wt % of milk fat, and 10 wt % of soybean oil were melted at 60° C. to prepare a compounded oil. The SFC of the compounded oil was 50% at 10° C. and 20% at 20° C. The compounded oil had a triglyceride SMS content of 2.5 wt %, and a triglyceride MSM content of 2.5 wt %. The triglyceride SMS to triglyceride MSM molar ratio was 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (M), which was plasticized by rapid cooling at a rate of −20° C./min or higher to obtain a margarine type fat and oil composition. The resulting roll-in fat and oil composition was shaped into a sheet of 285 mm in width, 420 mm in length, and 9 mm in thickness.

It was confirmed under an optical microscope that the resulting fat and oil composition contained fine fat and oil crystals of 3 μm or smaller. The oil phase of the fat and oil composition was analyzed by X-ray diffractometry under the same conditions as described above to confirm that the fat and oil crystals were β crystals of double chain length structure. The roll-in fat and oil composition was soft in low temperature, plastic over a wide temperature range, and excellent in extensibility as demonstrated by rheometer's readings of 3300 g/cm² at 5° C. and 400 g/cm² at 20° C. After an elapse of one month from the preparation, the rheometer's reading at 5° C. was still 3300 g/cm², which demonstrated stability against change in hardness with time.

Pastries were made using the roll-in fat and oil composition according to the same formulation and method as in Example 4. The lifts of the resulting pastries averaged 12.8 as measured in the same manner as in Example 4, proving the pastries puffy.

EXAMPLE 19

Seventy-five weight percent of a lard soft fraction and 25% by weight of a palm mid fraction were mixed to obtain a mixed oil (m) containing 16 wt % of a triglyceride represented by SMS and 16 wt % of a triglyceride represented by MSM. The mixed oil (m) was melted at 60° C. and cooled to 0° C. to crystallize. DSC analysis on crystal transformation revealed transformation into βcrystals without experiencing a β-prime form.

For confirmation, the mixed oil (m) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. Formation of compound crystals was thus confirmed. The fat and oil crystals were found to be fine crystals of 3 μm or smaller under an optical microscope.

The SFC of the mixed oil (m) was 50% at 10° C. and 16% at 20° C. The mixed oil (m) had a triglyceride SMS content of 16 wt % and a triglyceride MSM content of 16 wt %, giving a triglyceride MSM to triglyceride SMS molar ratio of 1.0.

An oil phase was prepared by mixing and melting 80.4 wt % of the mixed oil (m) with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (N), which was plasticized by rapid cooling at a rate of −20° C./min or higher to obtain a margarine type fat and oil composition. The resulting roll-in fat and oil composition was shaped into a sheet of 210 mm in width, 285 mm in length, and 9 mm in thickness.

It was confirmed under an optical microscope that the resulting fat and oil composition contained fine fat and oil crystals of 3 μm or smaller. The oil phase of the fat and oil composition was analyzed by X-ray diffractometry under the same conditions as described above to confirm that the fat and oil crystals were β crystals of double chain length structure and forming compound crystals. The proportion of the compound crystals in the total fat and oil content of the roll-in fat and oil composition was found to be 32 wt %.

The roll-in fat and oil composition was soft in low temperature, plastic over a wide temperature range, and excellent in extensibility as demonstrated by rheometer's readings of 2100 g/cm$^2$ at 5° C. and 250 g/cm$^2$ at 20° C. After an elapse of one month from the preparation, the rheometer's reading at 5° C. was still 2100 g/cm$^2$, which demonstrated stability against change in hardness with time.

Pastries were made using the roll-in fat and oil composition according to the same formulation and method as in Example 4. The lifts of the resulting pastries averaged 12.1 as measured in the same manner as in Example 4, proving the pastries puffy.

EXAMPLE 20

A margarine type roll-in fat and oil composition was prepared by plasticizing the emulsion (N) used in Example 19 by slow cooling at a rate of −1° C./min, whereas a generally adopted cooling rate in a rapid cooling step is −20° C./min or higher. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as used for the X-ray diffractometry of the hydrogenated oil (a) in Example 1 to confirm that the fat and oil crystals were β crystals of double chain length structure and forming compound crystals.

The roll-in fat and oil composition was soft in low temperature, plastic over a wide temperature range, and excellent in extensibility as demonstrated by rheometer's readings of 2000 g/cm$^2$ at 5° C. and 250 g/cm$^2$ at 20° C. After an elapse of one month from the preparation, the rheometer's reading at 5° C. was still 2000 g/cm$^2$, which demonstrated stability against change in hardness with time.

Pastries were made using the roll-in fat and oil composition according to the same formulation and method as used in Example 4. The lifts of the resulting pastries averaged 12.7, as measured in the same manner as in Example 4, proving the pastries puffy.

EXAMPLE 21

Forty-seven weight percent of a lard soft fraction and 53% by weight of palm oil were mixed to obtain a mixed oil (n) containing 13 wt % of a triglyceride represented by SMS and 13 wt % of a triglyceride represented by MSM. The mixed oil (n) was melted at 60° C. and cooled to 0° C. to crystallize. DSC analysis on crystal transformation revealed transformation into β crystals without experiencing a β-prime form.

For confirmation, the mixed oil (n) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line corresponding to a spacing of 4.6 Angstrom appeared, proving that the fat and oil crystals had a β form. Furthermore, X-ray diffraction pattern in a 2θ range of 0 to 8° revealed the double chain length packing configuration of the triglyceride molecules and formation of compound crystals. Observation of the fat and oil crystals under an optical microscope revealed that they were fine crystals of 3 μm or smaller.

The SFC of the mixed oil (n) was 50% at 10° C. and 18% at 20° C. The mixed oil (n) had a triglyceride SMS content of 13 wt % and a triglyceride MSM content of 13 wt %, giving a triglyceride MSM to triglyceride SMS molar ratio of 1.0.

An oil phase was prepared by mixing and melting 80.4 wt % of the mixed oil (n) with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (O), which was plasticized by rapid cooling at a rate of −20° C./min or higher to obtain a margarine type fat and oil composition. The resulting roll-in fat and oil composition was shaped into a sheet of 210 mm in width, 285 mm in length, and 9 mm in thickness.

It was confirmed under an optical microscope that the resulting fat and oil composition contained fine fat and oil crystals of 3 μm or smaller. The oil phase of the fat and oil composition was analyzed by X-ray diffractometry under the same conditions as described above to confirm that the fat and oil crystals were β crystals having a double chain length structure and forming compound crystals. The proportion of the compound crystals in the total fat and oil content of the roll-in fat and oil composition was found to be 26 wt %. The roll-in fat and oil composition was soft in low temperature, plastic over a wide temperature range, and excellent in extensibility as demonstrated by rheometer's readings of 2460 g/cm$^2$ at 5° C. and 260 g/cm$^2$ at 20° C. After an elapse of one month from the preparation, the rheometer's reading at 5° C. was still 2460 g/cm$^2$, which demonstrated stability against change in hardness with time.

Pastries were made using the roll-in fat and oil composition according to the same formulation and method as in Example 4. The lifts of the resulting pastries averaged 12.8 as measured in the same manner as in Example 4, proving the pastries puffy.

EXAMPLE 22

Seventy-six weight percent of a lard soft fraction and 24 wt % of mango kernel mid fraction were mixed to obtain a mixed oil (o) containing 21 wt % of a triglyceride represented by SMS and 21 wt % of a triglyceride represented by MSM. The mixed oil (o) was melted at 60° C. and cooled to 0° C. to crystallize. DSC analysis on crystal transformation revealed transformation into β crystals without experiencing a β-prime form.

For confirmation, the mixed oil (o) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. Formation of compound crystals was also confirmed. Observation of the fat and oil crystals under an optical microscope revealed that they were fine crystals of 3 μm or smaller.

The SFC of the mixed oil (o) was 48% at 10° C. and 19% at 20° C. The mixed oil (o) had a triglyceride SMS content of 21 wt % and a triglyceride MSM content of 21 wt %, giving a triglyceride MSM to triglyceride SMS molar ratio of 1.0.

An oil phase was prepared by mixing and melting 80.4 wt % of the mixed oil (o) with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (P), which was plasticized by rapid cooling at a rate of −20° C./min or higher to obtain a margarine type fat and oil composition. The resulting roll-in fat and oil composition was shaped into a sheet of 285 mm in width, 420 mm in length, and 9 mm in thickness.

It was confirmed under an optical microscope that the resulting fat and oil composition contained fine fat and oil crystals of 3 μm or smaller. The oil phase of the fat and oil composition was analyzed by X-ray diffractometry under the same conditions as described above to confirm that the fat and oil crystals were β crystals having a is double chain length structure and forming compound crystals. The proportion of the compound crystals in the total fat and oil content of the roll-in fat and oil composition was found to be 42 wt %.

The roll-in fat and oil composition was soft in low temperature, plastic over a wide temperature range, and excellent in extensibility as demonstrated by rheometer's readings of 1920 g/cm$^2$ at 5° C. and 910 g/cm$^2$ at 20° C. After an elapse of one month from the preparation, the rheometer's reading at 5° C. was still 2920 g/cm$^2$, which demonstrated stability against change in hardness with time.

Pastries were made using the roll-in fat and oil composition according to the same formulation and method as in Example 4. The lifts of the resulting pastries averaged 14.1 as measured in the same manner as in Example 4, proving the pastries puffy.

EXAMPLE 23

Sixty-one weight percent of a lard mid fraction and 39% by weight of a mango kernel mid fraction were mixed to obtain a mixed oil (p) containing 24 wt % of a triglyceride represented by SMS and 24 wt % of a triglyceride represented by MSM. The mixed oil (p) was melted at 60° C. and cooled to 0° C. to crystallize. DSC analysis on crystal transformation revealed transformation into β crystals without experiencing a β-prime form.

For confirmation, the mixed oil (p) was completely melted at 70° C. and maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.6 Angstrom, proving that the fat and oil crystals had a β form. Furthermore, X-ray diffraction pattern in a 2θ range of 0 to 8° showed that the triglyceride molecules were in a double chain length packing configuration. Formation of compound crystals was also confirmed. Observation of the fat and oil crystals under an optical microscope revealed that they were fine crystals of 3 μm or smaller.

Fifty-five weight percent of the mixed oil (p) and 45 wt % of soybean oil were mixed and melted at 60° C. to prepare a compounded oil. The SFC of the compounded oil was 47% at 10° C. and 20% at 20° C. The compounded oil had a triglyceride SMS content of 13 wt % and a triglyceride MSM content of 13 wt %, giving a triglyceride MSM to triglyceride SMS molar ratio of 1.0.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion (Q), which was plasticized by rapid cooling at a rate of −20° C./min or higher to obtain a margarine type fat and oil composition. The resulting roll-in fat and oil composition was shaped into a sheet of 210 mm in width, 285 mm in length, and 9 mm in thickness.

It was confirmed under an optical microscope that the resulting roll-in fat and oil composition contained fine fat and oil crystals of 3 μm or smaller. The oil phase of the roll-in fat and oil composition was analyzed by X-ray diffractometry under the same conditions as described above to confirm that the fat and oil crystals were β crystals having a double chain length structure and forming compound crystals. The proportion of the compound crystals in the total fat and oil content of the roll-in fat and oil composition was found to be 26 wt %.

The roll-in fat and oil composition was soft in low temperature, plastic over a wide temperature range, and excellent in extensibility as demonstrated by rheometer's readings of 2500 g/cm$^2$ at 5° C. and 720 g/cm$^2$ at 20° C. After an elapse of one month from the preparation, the rheometer's reading at 5° C. was still 2500 g/cm$^2$, which demonstrated stability against change in hardness with time.

Pastries were made using the roll-in fat and oil composition according to the same formulation and method as in Example 4. The lifts of the resulting pastries averaged 13.8 as measured in the same manner as in Example 4, proving the pastries puffy.

COMPARATIVE EXAMPLE 1

Fish oil was hydrogenated in the presence of a nickel catalyst to obtain a hydrogenated fish oil having a melting point of 45° C. The hydrogenated fish oil was melted at 60° C. and cooled to 0° C. for crystallization. DSC analysis on crystal transformation revealed that the fat and oil crystals had a β-prime form. For confirmation, the hydrogenated fish oil: was completely melted at 70° C., maintained at 0° C. for 30 minutes and then at 5° C. for 30 minutes, and the precipitated fat and oil crystals were analyzed by X-ray diffractometry in a 2θ range of 0 to 8°. As a result, a diffraction peak corresponding to a spacing of 50 Angstrom appeared, proving that the triglyceride molecules were in a double chain length packing configuration. Furthermore, X-ray diffractometry was carried out in a 2θ range of 17 to 26°. As a result, the ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 0.8, and an intense diffraction line corresponding to a spacing of 4.2 Angstrom appeared. It was thus confirmed that the fat and oil crystals had a β-prime form.

A mixture of 60 wt % of the hydrogenated fish oil and 40 wt % of soybean oil was melted at 60° C. to prepare a compounded oil. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type fat and oil composition.

The oil phase of the resulting fat and oil composition was analyzed by X-ray diffractometry under the same conditions as described above. A diffraction peak appeared at 50 Angstrom, which revealed a double chain length structure. The ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 0.7. It was thus confirmed that the fat and oil crystals had a β-prime form.

Immediately after the preparation, the rheometer reading of the fat and oil composition at 5° C. was 2680 g/cm$^2$ whereas that after one month from the preparation was 3990 g/cm$^2$, indicating hardening with time. That is, the fat and oil composition had poor stability.

COMPARATIVE EXAMPLE 2

Corn oil was hydrogenated using a nickel catalyst to obtain hydrogenated corn oil having a melting point of 36° C. The hydrogenated corn oil was melted at 60° C. and cooled to 0° C. for crystallization. DSC analysis on crystal transformation revealed that the fat and oil crystals had a β-prime form. For confirmation, the hydrogenated corn oil was completely melted at 70° C., maintained at 0° C. for 30 minutes and then at 5° C. for 30 minutes, and the resulting fat and oil crystals were analyzed by X-ray diffractometry in a 2θ range of 0 to 8°. As a result, a diffraction peak appeared at a spacing of 49 Angstrom, proving that the triglyceride molecules were in a double chain length packing configuration. Furthermore, X-ray diffractometry was carried out in a 2θ range of 17 to 26°. The ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 0.7, and an intense diffraction line appeared at a spacing of 4.2 Angstrom. It was thus confirmed that the fat and oil crystals had a β-prime form.

A mixture of 70 wt % of the hydrogenated corn oil and 30 wt % of soybean oil was melted at 60° C. to prepare a compounded oil. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type fat and oil composition.

The oil phase of the fat and oil composition was analyzed by X-ray diffractometry under the same conditions as described above. A diffraction peak appeared at 50 Angstrom, which revealed a double chain length structure. The ratio of the highest peak intensity corresponding to a spacing of 4.6 Angstrom (peak intensity 1) to the highest peak intensity corresponding to a spacing of 4.2 Angstrom (peak intensity 2), i.e., peak intensity 1/peak intensity 2 was 0.7. It was thus confirmed that the fat and oil crystals had a β-prime form.

The fat and oil composition was fine crystals of 5 μm or smaller under an optical microscope immediately after the rapid cooling for plasticization. In one month, however, the crystals transformed to coarse crystals reaching as large as 30 μm, turning into a commercially valueless product with a very rough feel. The rheometer reading of the fat and oil composition at 5° C. was 1730 g/cm$^2$ immediately after the preparation but increased to 2980 g/cm$^2$ after one month from the preparation, indicating hardening with time. That is, the fat and oil composition had poor stability.

COMPARATIVE EXAMPLE 3

Fish oil was hydrogenated in the presence of a nickel catalyst to obtain a hydrogenated fish oil having a melting point of 45° C. The hydrogenated fish oil was melted at 60° C. and cooled to 0° C. for crystallization. DSC analysis on crystal transformation revealed that the crystals had a β-prime form. For confirmation, the hydrogenated fish oil was completely melted at 70° C., maintained at 0° C. for 30 minutes and then at 5° C. for 30 minutes, and the resulting fat and oil crystals were analyzed by X-ray diffractometry in a 2θ range of 17 to 26°. An intense diffraction line appeared at a spacing of 4.2 Angstrom, indicating that the crystals had a β-prime form. Furthermore, a diffraction pattern measured at a 2θ range of 0 to 8 ° provided the confirmation that the triglyceride molecules were in a triple chain length packing configuration and that no compound crystals was present.

A mixture of 55 wt % of the hydrogenated fish oil, 20 wt % of milk fat, and 25 wt % of soybean oil was melted at 60° C. to prepare a compounded oil. The SFC of the compounded oil was 45% at 10° C. and 33% at 20° C.

An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

The oil phase of the roll-in fat and oil composition was analyzed by X-ray diffractometry under the same conditions as described above to give the confirmation that the fat and oil crystals were β-prime crystals having a triple chain length structure.

Immediately after the preparation, the rheometer reading of the roll-in fat and oil composition at 5° C. was 2470 g/cm² whereas that after one month from the preparation increased to 3580 g/cm², indicating hardening with time. That is, the roll-in fat and oil composition had poor stability.

Pastries were made using the roll-in fat and oil composition according to the same formulation and method as in Example 4. The lifts of the resulting pastries averaged 8.0 as measured in the same manner as in Example 4, proving the roll-in fat and oil composition unable to provide sufficiently puffy pastries.

COMPARATIVE EXAMPLE 4

Corn oil was hydrogenated in the presence of a nickel catalyst to obtain a hydrogenated corn oil having a melting point of 36° C. The hydrogenated corn oil was melted at 60° C. and cooled to 0° C. for crystallization. DSC analysis on crystal transformation revealed that the crystals had a β-prime form. For confirmation, the hydrogenated corn oil was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.2 Angstrom, indicating that the crystals had a β-prime form. Furthermore, a diffraction pattern measured at a 2θ range of 0 to 8° provided the confirmation that the triglyceride molecules were in a triple chain length packing configuration and that no compound crystals was present.

A mixture of 70 wt % of the hydrogenated corn oil and 30 wt % of soybean oil was melted at 60° C. to prepare a compounded oil. The SFC of the compounded oil was 35% at 10° C. and 20% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

The oil phase of the roll-in fat and oil composition was analyzed by X-ray diffractometry under the same conditions as described above to give the confirmation that the fat and oil crystals were β-prime crystals having a triple chain length structure.

The roll-in fat and oil composition was fine crystals of 5 μm or smaller under an optical microscope immediately after the rapid cooling for plasticization. In one month, however, the crystals transformed to coarse crystals reaching as large as 30 μm, turning into a commercially valueless product with a very rough feel. The rheometer reading of the roll-in fat and oil composition at 5° C. was 1500 g/cm² immediately after the preparation but increased to 2400 g/cm² after one month from the preparation, indicating hardening with time. That is, the fat and oil composition had poor stability.

Pastries were made using the roll-in fat and oil composition according to the same formulation and method as in Example 4. The lifts of the resulting pastries averaged 7.9 as measured in the same manner as in Example 4, proving the roll-in fat and oil composition unable to provide sufficiently puffy pastries.

COMPARATIVE EXAMPLE 5

Eighteen weight percent of the hydrogenated fish oil used in Comparative Example 3 (melting point: 45° C.), 32 wt % of a shea mid fraction, 25 wt % of milk fat, and 25 wt % of soybean oil were mixed and melted at 60° C. to obtain a compounded oil. The compounded oil was melted at 60° C. and cooled to 0° C. for crystallization. DSC analysis on crystal transformation revealed that the crystals had a β-prime form.

For confirmation, the compounded oil was completely melted at 70° C., maintained at 0° C. for 30 minutes and then at 5° C. for 30 minutes, and the precipitated fat and oil crystals were analyzed by X-ray diffractometry in a 2θ range of 17 to 26°. As a result, intense diffraction lines appeared at spacings of 4.2 Angstrom and 4.6 Angstrom, indicating that the crystals had a β-prime/β mixed form. Furthermore, a diffraction pattern measured at a 2θ range of 0 to 8° provided the confirmation that the triglyceride molecules were in a triple chain length packing configuration and that no compound crystals was present.

The SFC of the compounded oil was 53% at 10° C. and 45% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

The oil phase of the roll-in fat and oil composition was analyzed by X-ray diffractometry under the same conditions as described above. It was confirmed as a result that the fat and oil crystals had a β/β-prime mixed form having a triple chain length structure.

The roll-in fat and oil composition was fine crystals of 5 μm or smaller under an optical microscope immediately after the rapid cooling for plasticization. In one month, however, the crystals transformed to coarse crystals reaching as large as 30 μm, turning into a commercially valueless product with a very rough feel. The rheometer reading of the roll-in fat and oil composition at 5° C. was 3700 g/cm² immediately after the preparation but increased to 5900 g/cm² after one month from the preparation, indicating hardening with time. That is, the fat and oil composition had poor stability. Moreover, the temperature range in which the composition was plastic was considerably narrow, far from satisfaction.

Pastries were made using the resulting roll-in fat and oil composition according to the same formulation and method as in Example 4. The lifts of the resulting pastries averaged 7.5 as measured in the same manner as in Example 4. It is seen from this result that the roll-in fat and oil composition was unable to provide sufficiently puffy pastries.

COMPARATIVE EXAMPLE 6

Rape seed oil was hydrogenated in the presence of a nickel catalyst to obtain a hydrogenated rape seed oil having a melting point of 45° C. The hydrogenated rape seed oil having a melting point of 45° C. was melted at 60° C. and cooled to 0° C. for crystallization. DSC analysis on crystal transformation revealed that the crystals had a β-prime form. The hydrogenated rape seed oil having a melting point of 45° C. contained neither a triglyceride represented by SMS nor a triglyceride represented by MSM.

For confirmation, the hydrogenated rape seed oil was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, an intense diffraction line appeared at a spacing of 4.2 Angstrom, indicating that the crystals had a β-prime form. Furthermore, a diffraction pattern measured at a 2θ range of 0 to 8° provided the confirmation that the triglyceride molecules were in a triple chain length packing configuration. Formation of compound crystals was not observed.

A mixture of 55 wt % of the hydrogenated rape seed oil and 45 wt % of soybean oil were mixed to prepare a compounded oil, which contained neither a triglyceride represented by SMS nor a triglyceride presented by MSM. The SFC of the compounded oil was 38% at 10° C. and 22% at 20° C. An oil phase was prepared by mixing and melting 80.4 wt % of the compounded oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

The oil phase of the roll-in fat and oil composition was analyzed by X-ray diffractometry under the same conditions as described above to give the confirmation that the fat and oil crystals were β-prime crystals having a triple chain length structure and contained no compound crystals.

The roll-in fat and oil composition was fine crystals of 5 μm or smaller under an optical microscope immediately after the rapid cooling for plasticization. In one month, however, the crystals transformed to coarse crystals reaching as large as 30 μm, turning into a commercially valueless product with a very rough feel. The rheometer reading of the roll-in fat and oil composition at 5° C. was 2000 g/cm² immediately after the preparation but increased to 3000 g/cm² after one month from the preparation, indicating hardening with time. That is, the fat and oil composition had poor stability.

Pastries were made using the resulting roll-in fat and oil composition according to the same formulation and method as in Example 4. The lifts of the resulting pastries averaged 8.0 as measured in the same manner as in Example 4. It is seen from this result that the roll-in fat and oil composition was unable to provide sufficiently puffy pastries.

COMPARATIVE EXAMPLE 7

Eighteen weight percent of the hydrogenated rape seed oil used in Comparative Example 6 (melting point: 45° C.), 32 wt % of cocoa butter, and 50 wt % of soybean oil were mixed. The hydrogenated rape seed oil, the cocoa butter, and the soybean oil contained no triglyceride represented by MSM. The resulting mixed oil contained no triglyceride represented by MSM and had a triglyceride SMS content of 28 wt %.

For confirmation, the mixed oil was completely melted at 70° C., maintained at 0° C. for 30 minutes and then at 5° C. for 30 minutes, and the resulting fat and oil crystals were analyzed by X-ray diffractometry in a 2θ range of 17 to 26°. As a result, intense diffraction lines appeared at spacings of 4.2 Angstrom and 4.6 Angstrom, indicating that the crystals had a β-prime/β mixed form.

The SFC of the mixed oil was 53% at 10° C. and 45% at 20° C. An oil phase was prepared by mixing and melting 80.4 wt % of the mixed oil with 0.5 wt % of glycerol monostearate and 0.1 wt % of lecithin as emulsifiers. The oil phase (81 wt %), water (16 wt %), sodium chloride (1 wt %), and skim milk powder (2 wt %) were emulsified in a usual manner to form a water-in-oil emulsion, which was plasticized by rapid cooling at a rate of −20° C./min or higher to obtain a margarine type roll-in fat and oil composition. The resulting roll-in fat and oil composition was shaped into a sheet of 210 mm in width, 285 mm in length, and 9 mm in thickness.

The oil phase of the roll-in fat and oil composition was analyzed by X-ray diffractometry under the same conditions as described above to give the confirmation that the fat and oil crystals were β-prime/β mixed form crystals.

The roll-in fat and oil composition was fine crystals of 5 μm or smaller under an optical microscope immediately after the rapid cooling for plasticization. In one month, however, the crystals transformed to coarse crystals reaching as large as 30 μm, turning into a commercially valueless product with a very rough feel. The rheometer reading of the roll-in fat and oil composition at 5° C. was 900 g/cm² immediately after the preparation but increased to 2800 g/cm² after one month from the preparation, indicating hardening with time. That is, the fat and oil composition had poor stability.

Pastries were made using the resulting roll-in fat and oil composition according to the same formulation and method as in Example 4. The lifts of the resulting pastries averaged 7.5 as measured in the same manner as in Example 4. As can be seen from this result, the roll-in fat and oil composition was unable to provide sufficiently puffy pastries.

From the above results, the comparative fat and oil compositions, the oil phase of which crystallizes into crystals having a β-prime form or a triple chain length structure, undergo hardness change with time, being problematic in terms of crystal stability. In contrast, the fat and oil compositions of Examples, the oil phase of which crystallizes into β form crystals having a double chain length structure, are plastic over a wide temperature range, soft even in low temperatures, and stable against change in hardness with time. In other words, they exhibit excellent crystal stability.

INDUSTRIAL APPLICABILITY

The present invention relates to a fat and oil composition characterized in that, when the oil phase thereof is completely melted at 70° C. and maintained at 0° C. for 30 minutes and then at 5° C. for 7 days, the resulting fat and oil crystals are β form crystals having a double chain length structure. The fat and oil composition of the invention is prepared without involving special temperature control and yet comprises stable crystals. It is soft in low temperature, plastic over a wide temperature range, and stable against change in hardness with time.

The invention claimed is:

1. A fat and oil composition comprising an oil phase which comprises one of:
   (a) a fat and oil (1) containing a triglyceride represented by StEE, wherein St is stearic acid, and E is elaidic acid, at a proportion in which the triglyceride content is 6.7% to 17.5% by weight; or
   (b) a fat and oil (2) capable of forming compound crystals of: (i) a triglyceride represented by $S_1MS_2$, wherein $S_1$ and $S_2$ each is a saturated fatty acid, and M is a mono-unsaturated fatty acid, and/or (ii) a triglyceride represented by $MS_3M$, wherein $S_3$ is a saturated fatty acid, and M is a mono-unsaturated fatty acid, in which the molar ratio of $MS_3M/S_1M_2$ is 0.4 to 2.5 and the proportion of the content of compound crystals is 5% to 42% by weight;

wherein, when the oil phase of said fat and oil composition is completely melted at 70° C. and maintained at 0° C. for 30 minutes and then at 5° C. for 7 days, the resulting fat and oil crystals are β form crystals having a double chain length structure.

2. The fat and oil composition according to claim 1, wherein the fat and oil crystals exist substantially in the form of fine crystals.

3. The fat and oil composition according to claim 1, wherein the fat and oil (2) is a mixture of the fat and oil containing a triglyceride represented by $S_1MS_2$ and a fat and oil containing a triglyceride represented by $MS_3M$.

4. The fat and oil composition according to claim 3, wherein the fat and oil containing the triglyceride represented by $MS_3M$ is a lard-based fat and oil.

5. The fat and oil composition according to claim 4, wherein the lard-based fat and oil is a soft fraction of lard.

6. The fat and oil composition according to claim 3, wherein the fat and oil containing the triglyceride represented by $S_1MS_2$ is at least one member selected from the group consisting of: shea butter, a mid fraction of shea butter, sal butter, a mid fraction of sal butter, mango butter, a mid fraction of mango butter, illipe butter, a mid fraction of illipe butter, cocoa butter, a mid fraction of cocoa butter, kokum butter, a mid fraction of kokum butter, dhupa butter, a mid fraction of dhupa butter, mowrah butter, a mid fraction of mowrah butter, phulwara butter, a mid fraction of phulwara butter, Chinese tallow, a mid fraction of Chinese tallow, high-oleic sunflower oil, a mid fraction of high-oleic sunflower oil, palm oil, a palm mid fraction, beef tallow, and a mid fraction of beef tallow.

7. The fat and oil composition according to claim 1, which contains milk fat.

8. The fat and oil composition according to claim 1, which is plastic.

9. The fat and oil composition according to claim 1, which is for roll-in applications.

10. The fat and oil composition according to claim 9, wherein fat and oil in the oil phase has a solid fat content (SFC) of 20 to 60% at 10° C. and 10 to 40% at 20° C.

11. The fat and oil composition according to claim 1, which is of margarine type.

12. The fat and oil composition according to claim 1, which is of shortening type.

13. A bakery dough comprising a fat and oil composition according to claim 1.

14. A bakery product obtained by baking a bakery dough according to claim 13.

15. A food comprising a fat and oil composition according to claim 1.

16. A method of producing a fat and oil composition, said method comprising melting and cooling an oil phase which comprises one of:

(a) a fat and oil (1) containing a triglyceride represented by StEE, wherein St is stearic acid, and E is elaidic acid, at a proportion in which the triglyceride content is 6.7% to 17.5% by weight, or (b) a fat and oil (2) capable of forming compound crystals of: (i) a triglyceride represented by $S_1MS_2$, wherein $S_1$ and $S_2$ each is a saturated fatty acid, and M is a mono-unsaturated fatty acid, and/or (ii) a triglyceride represented by $MS_3M$, wherein $S_3$ is a saturated fatty acid, and M is a mono-unsaturated fatty acid, in which the molar ratio of $MS_3M/_1MS_2$ is 0.4 to 2.5 and the proportion of the content of compound crystals is 5% to 42% by weight, wherein said oil phase crystallizes into fat and oil crystals of β form having a double chain length structure when completely melted at 70° C. and maintained at 0° C. for 30 minutes and then at 5° C. for 7 days.

* * * * *